US008678737B2

(12) United States Patent
DiGiovanni et al.

(10) Patent No.: US 8,678,737 B2
(45) **Date of Patent: *Mar. 25, 2014**

(54) PERSONAL MOBILITY VEHICLE LIFT

(76) Inventors: Anthony P. DiGiovanni, Bradenton, FL (US); Jeffery R. Moone, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/507,912

(22) Filed: Aug. 6, 2012

(65) Prior Publication Data

US 2012/0308351 A1 Dec. 6, 2012

Related U.S. Application Data

(63) Continuation of application No. 12/383,686, filed on Mar. 27, 2009, now Pat. No. 8,235,644.

(51) Int. Cl.
*B60P 9/00* (2006.01)

(52) U.S. Cl.
USPC .......................................... 414/462; 414/921

(58) Field of Classification Search
None
See application file for complete search history.

(56) References Cited

U.S. PATENT DOCUMENTS

| | | | | |
|---|---|---|---|---|
| 4,741,660 | A * | 5/1988 | Kent | 414/462 |
| 5,431,522 | A * | 7/1995 | Ross | 414/462 |
| 5,567,107 | A * | 10/1996 | Bruno et al. | 414/462 |
| 5,816,763 | A * | 10/1998 | Hamann et al. | 414/462 |
| 6,007,289 | A * | 12/1999 | Kruse et al. | 414/462 |
| 6,692,215 | B1 * | 2/2004 | Panzarella et al. | 414/462 |
| 6,729,827 | B1 * | 5/2004 | Williams et al. | 414/462 |
| 6,887,027 | B2 * | 5/2005 | O'Leary et al. | 414/462 |
| 7,686,562 | B2 * | 3/2010 | Panzarella et al. | 414/462 |
| D619,324 | S * | 7/2010 | DiGiovanni et al. | D34/28 |
| 7,798,760 | B2 * | 9/2010 | Strassman et al. | 414/462 |
| 7,815,413 | B2 * | 10/2010 | Fisher et al. | 414/812 |
| 2003/0156930 | A1 * | 8/2003 | Ahedo, Jr. | 414/462 |
| 2003/0165376 | A1 * | 9/2003 | Bruno et al. | 414/462 |
| 2005/0079037 | A1 * | 4/2005 | Boyd | 414/462 |
| 2006/0062657 | A1 * | 3/2006 | Davis et al. | 414/462 |
| 2008/0206030 | A1 * | 8/2008 | Reuille et al. | 414/462 |
| 2010/0028115 | A1 * | 2/2010 | Ablabutyan et al. | 414/539 |
| 2010/0124477 | A1 * | 5/2010 | Wang | 414/462 |

* cited by examiner

*Primary Examiner* — Joshua Rudawitz
(74) *Attorney, Agent, or Firm* — Arthur W. Fisher, III

(57) ABSTRACT

A personal mobility vehicle lift mounted to the rear portion of a vehicle to transport a personal mobility vehicle from location to location comprising a platform assembly configured to support a personal mobility vehicle thereon operatively coupled to a lift assembly to selectively raise and lower the platform assembly with or without a personal mobility vehicle thereon and a mount assembly coupled to the lift assembly to mount the personal mobility vehicle lift to the rear portion of a vehicle.

7 Claims, 4 Drawing Sheets

PERSONAL MOBILITY VEHICLE LIFT

CROSS-REFERENCE

This is a continuation application of patent application Ser. No. 12/383,686 filed Mar. 27, 2009 now U.S. Pat. No. 8,235,644.

BACKGROUND OF THE INVENTION

1. Field of the Invention

A personal mobility vehicle lift operatively mounted to the rear portion of a vehicle to transport a personal mobility vehicle from location to location.

2. Description of the Prior Art

Numerous lifts and hoists have been designed to transport personal mobility vehicle on the rear of vehicles. Unfortunately, such devices generally require extensive electrical wiring, complex mechanical modification and usually occupy a significant portion of limited available trunk space. Thus there exists a need for an externally mounted wheelchair lift requiring a minimum of electrical and mechanical conversion.

U.S. Pat. No. 6,729,827 B1 discloses a power wheelchair lift and restraint system for attachment to a rear of a vehicle including a lift platform having a substantially flat, uninterrupted generally rectangular support surface sized in length and width to be similar to, and to supportively receive, a broad size and configuration range of power wheelchairs thereon. A power lift mechanism is attachable to the rear of the vehicle and supportively connected to the platform for elevating and lowering the platform with the power wheelchair positioned thereron.

U.S. Pat. No. 5,090,580 teaches a portable crane for hoisting electric scooters, wheel-chairs and the like which includes a column assembly, a boom assembly, a base assembly and a winch assembly. The column assembly is removably and pivotally mounted between an opened vehicle trunk lid and a trunk floor. The column assembly includes top and bottom pivot pins which rotatably engage pivot pin receiving holes and about which the boom assembly rotates. The column assembly and boom assembly are collapsible so as to allow the trunk lid to close.

U.S. Pat. No. 4,127,200 discloses an apparatus for hoisting a wheelchair into and out of an enclosure including a swivel base having a stationary section that may be secured within the enclosure and a section rotatable on the stationary section about a vertical axis. A motor mount is positioned above and is connected to the rotatable section of the swivel base. An angled arm is pivotally connected to the motor mount and is capable of standing rigidly upright when in use and capable of folding down when not in use. A cable, attached to a reel at one end, has a series of pulleys located on the angled arm to guide the cable over the angled arm. The reel is formed to the motor mount and is connected to a motor on the motor mount through use of gearing. A hook is formed at the other end of the cable for use in hoisting.

U.S. Pat. No. 4,746,263 shows a telescoping hoist assembly normally stored in the rear bumper area of a pickup truck including a boom telescoping into and out of a mast pivotally anchored at one end of the pickup bumper structure. A power winch operated by the pickup electrical system is axially mounted on the outward end of the boom. With the boom extended out of the mast the cable is connected with the anchored area of the mast for a hoist self erecting action interrupted, when the mast is vertical, by stop members at the base end of the mast. A mast stored jack structure supports hoist loads independently of the pickup suspension system.

U.S. Pat. No. 4,406,574 teaches a device for lifting and loading objects into and out of a storage space of an automobile for transportation thereby. The device is fully contained within the storage space and is adapted to be mounted directly to the chassis of the automobile. The device is particularly suited to assist disabled individuals who may be unable to lift, load and transport such objects otherwise.

U.S. Pat. No. 5,114,120 relates to a system designed to enable equipment mounted on the outside of a motor vehicle to swing away from the mounting point when access to the vehicle is necessary while, at the same time, protecting people in the area from undesired and/or inadvertent operation of the equipment when not properly secured to the mounting point.

U.S. Pat. No. 4,391,379 discloses a lifting device adapted to be mounted within an automobile trunk having a rigid boom mounted for free pivotal movement about both vertical and horizontal axes. The lifting device includes a motor driven lift mounted at the distal end of the boom. A counterbalance member is employed to counterbalance the gravitational force biasing the boom in downward movement about its horizontal axis so that the boom may be easily pivoted upwardly or downwardly by a handicapped person. A prop assembly may be manually moved into position to positively maintain the boom in an elevated lifting position.

U.S. Pat. No. 4,881,864 shows a swingable boom-type hoist which is characterized by a forwardly-projecting tongue of rectangular cross section that telescopes into the box-beam style drawbar of a conventional trailer hitch carried by the load-carrying vehicle thus cooperating therewith to maintain the stanchion from which the tongue projects in an upright position. The boom on the upper end of the stanchion can swing through a complete circle and is preferably vertically adjustable. An important feature is the retractable foot on the lower end of the stanchion which can be raised off the ground while the load in the load-carrying vehicle is transported from one place to another without having to dismount the hoist. A conventional winch is used to raise and lower the load.

U.S. Pat. No. 3,854,594 teaches a collapsible hoisting apparatus comprising an upright member having a shoe at one end and a swivel pin mounted in the shoe and adapted to pivotally seat in a socket. A boom head affixes one end of a boom to the other end of the upright member for rotation from a position in which the boom is parallel to the upright member in the plane of the boom and the upright member to a position in which the boom is at right angles to the upright member in the plane. A trolley device is movably mounted on the boom for movement along the length thereof. A cable winding device is rotatably mounted on the trolley device. A cable having a hook at one end thereof and affixed to the cable winding device at the other end thereof is wound on the cable winding device. A turning device coupled to the cable winding device extends beyond the boom head for selective manual winding and unwinding of the cable.

U.S. Pat. No. 4,419,038 shows a foldable hoist assembly with an elongated column with a boom pivotally mounted at its outer end to be movable from a stored position alongside the column to its operating position. A spindle with radial and thrust bearings in the support column base provides rotary support so that loads suspended from the boom can be swung over and away from the load bed. The base of the support column is also pivotally mounted on a horizontal support structure affixed to the vehicle chassis, preferably in the position of a bumper below the rear edge of the load bed. With boom stored alongside, the support column is rotated from its upright operating position to be supported horizontally within the support structure leaving the load bed unobstructed.

U.S. Pat. No. 4,738,581 shows an automobile bumper mounted wheelchair carrier includes an extendible hydraulic cylinder secured to a trailer-type bumper hitch. In the lowered position, a support plate receives the two rear wheels, upper lock members are aligned with the side frames of the wheelchair.

U.S. Pat. No. 4,741,660 describes a vehicle-mounted apparatus for lifting and transporting a wheelchair comprising a base onto which the power wheelchair is driven and parked and a motorized lift mechanism to lift the base and wheelchair for transport.

U.S. Pat. No. 5,137,411 shows an apparatus for transporting a motor scooter on the back of a motor vehicle such as an automobile, van, pick-up truck or the like. The apparatus platform can be lowered so the motor scooter can be loaded onto the platform. A restraining bar is used to secure the scooter to the platform. To remove the motor scooter, the platform is lowered to the ground, the lowering of the platform causing the restraining bar to be released.

Additional examples of the prior art are found in U.S. Pat. No. 4,534,450; U.S. Pat. No. 4,775,282; U.S. Pat. No. 5,011,361; U.S. Pat. No. 5,261,779; U.S. Pat. No. 5,431,522; U.S. Pat. No. 5,482,424; U.S. Pat. No. 5,567,107; U.S. Pat. No. 6,007,289; U.S. Pat. No. 6,386,817; U.S. Pat. No. 6,579,055; U.S. Pat. No. 6,655,895; U.S. Pat. No. 6,692,215; U.S. Pat. No. 6,887,027; U.S. Pat. No. 7,341,417: U.S. Pat. No. 7,380,803; U.S. Pat. No. 7,445,416; US 2003/0165376 and US 2006/0093462.

SUMMARY OF THE INVENTION

The present invention relates to a personal mobility vehicle lift configured to be operatively mounted to the rear portion of a vehicle to transport a personal mobility vehicle from location to location. The personal mobility vehicle lift comprises a platform assembly configured to support the personal mobility vehicle thereon coupled to a lift assembly to selectively raise and lower the platform assembly and a mount assembly coupled to the lift assembly to mount the personal mobility lift to the rear portion of the vehicle.

The platform assembly comprises a frame including wheel guide members to engage and direct the front wheels of the personal mobility vehicle into a corresponding wheel well formed on the platform assembly.

The platform assembly is pivotally coupled to the lift assembly to allow the platform assembly to be pivoted between a deployed position where the platform assembly is substantially horizontal to support the personal mobility vehicle and a stored position in a substantially vertical position when the personal mobility vehicle lift not in use.

The lift assembly comprises a column including a hollow upper column member pivotally coupled to the mount assembly to allow the lift assembly and the platform assembly to be tilted toward the rear of the vehicle as the platform assembly is raised from the lower position to the upper position whether the platform assembly is in the deployed position or stored position and a lower column member telescopingly disposed within the hollow upper column member. A reversible motor or power drive mechanism mounted to the upper portion of the hollow upper column member of the lift assembly is operatively coupled to the lower column member of the lift assembly to extend or retract the lower column member within the hollow upper column to lower or raise the platform assembly connected to the lower column member.

The mount assembly comprises a tongue to connect or mount the personal mobility vehicle lift to the vehicle and mount member coupled to the hollow upper column member of the lift assembly.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE INVENTION

Figure 1:
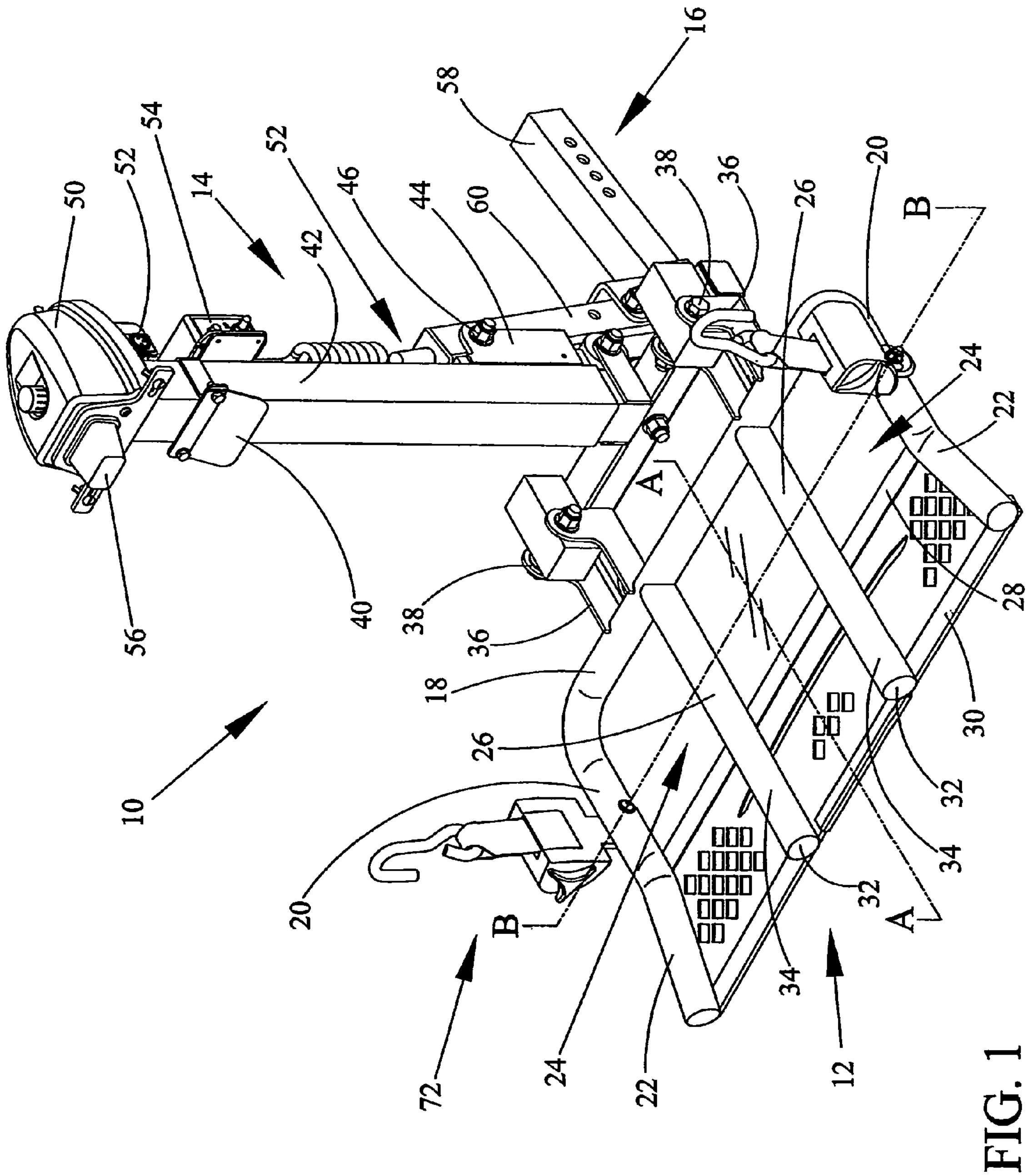
FIG. 1 is a perspective view of the personal mobility vehicle lift of the present invention.
Figure 2:
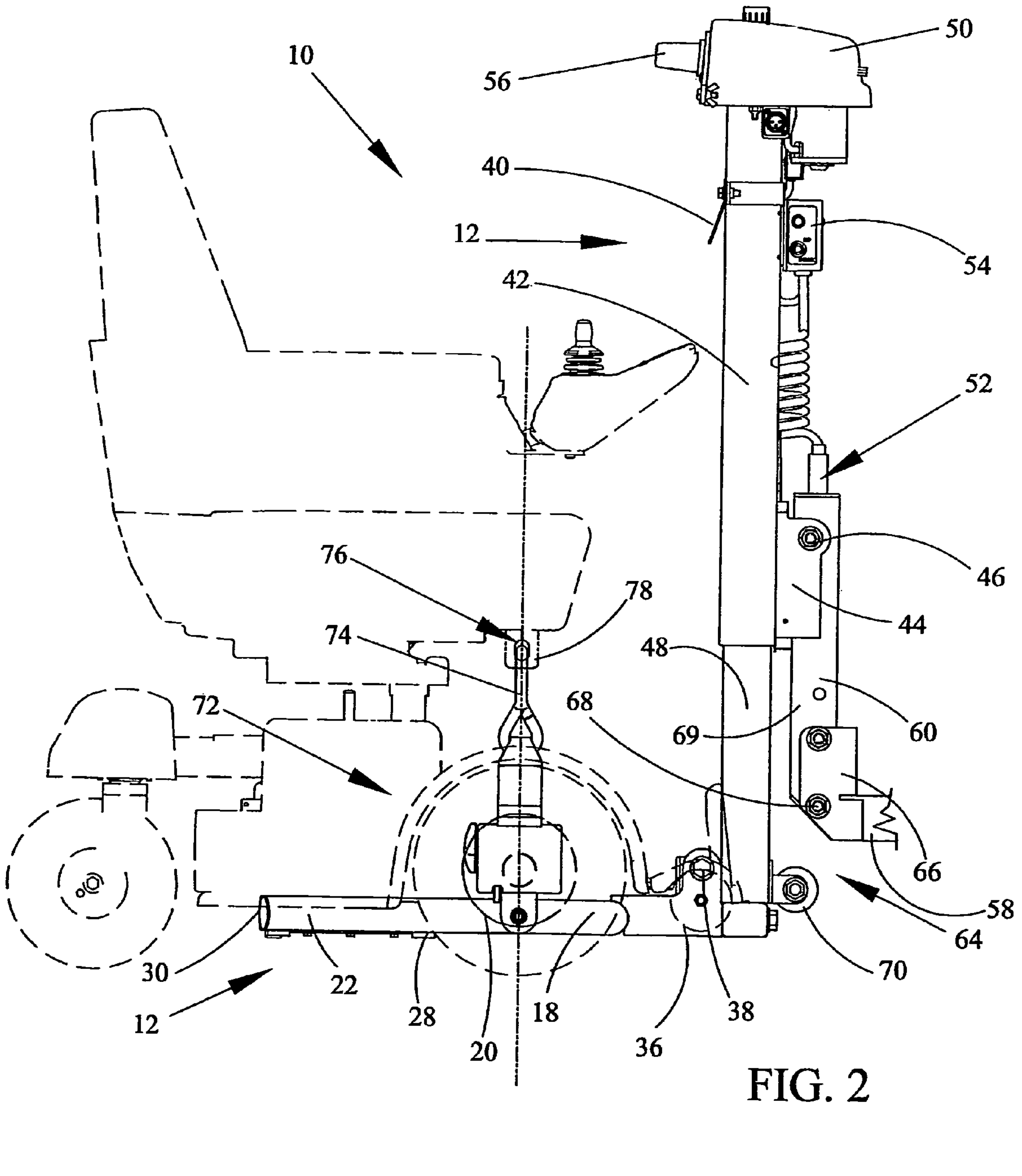
FIG. 2 is a side view of the personal mobility vehicle lift of the present invention with the platform assembly in the lower, deployed position.
Figure 3:
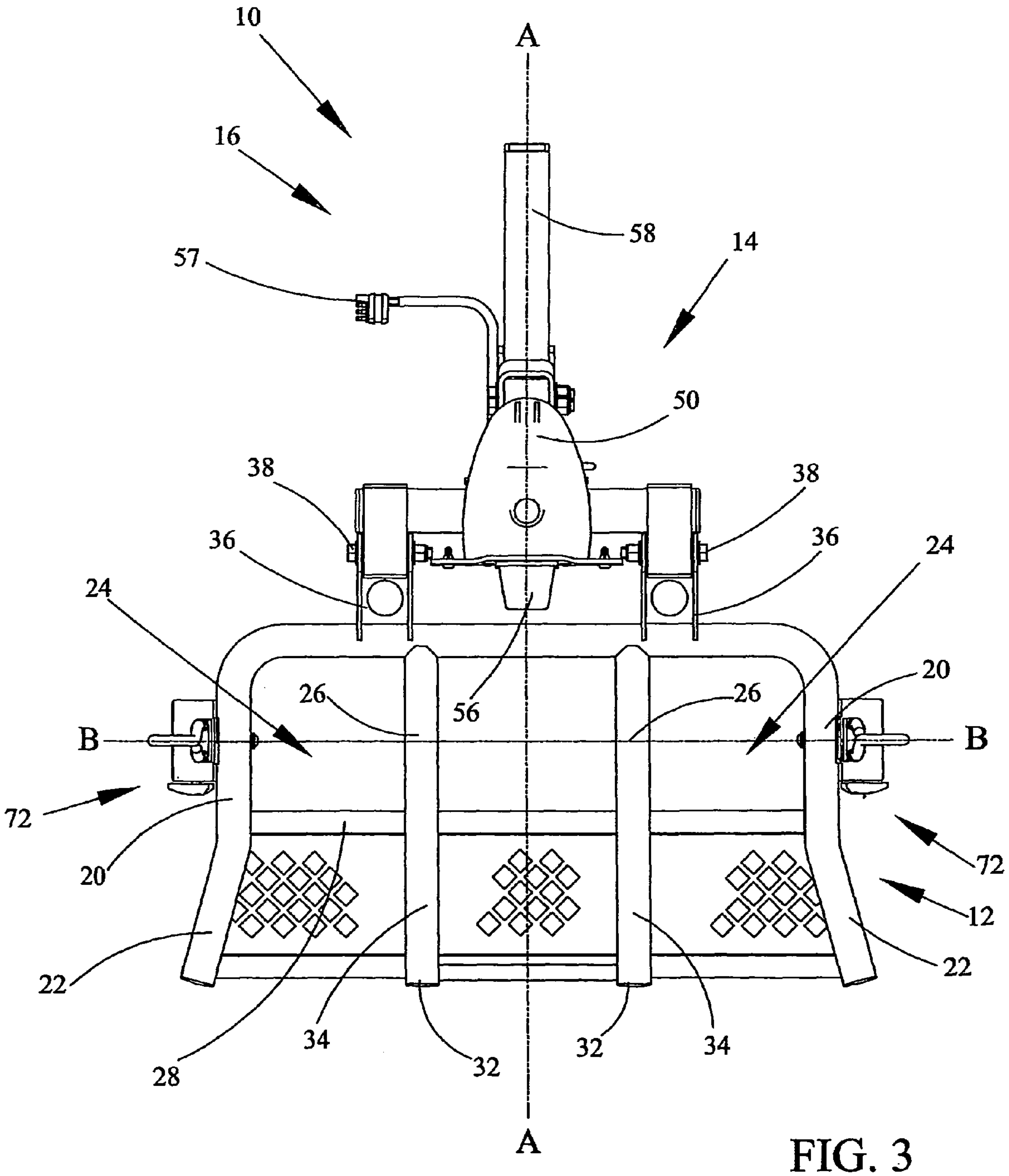
FIG. 3 is a top view of the personal mobility vehicle lift of the present invention.

As shown in FIGS. 1 through 4, the present invention relates to a personal mobility vehicle lift generally indicated as 10 configured to be operatively mounted to the rear portion of a vehicle (not shown) to transport a personal mobility vehicle as shown in FIG. 2 from location to location. The personal mobility vehicle lift 10 comprises a platform assembly generally indicated as 12 configured to support the personal mobility vehicle thereon coupled to a lift assembly generally indicated as 14 to selectively raise and lower the platform assembly 12 with or without a personal mobility vehicle thereon and a mount assembly generally indicated as 16 coupled to the lift assembly 14 to mount the personal mobility lift 10 to the rear portion of the vehicle (not shown).

The platform assembly 12 comprises a frame including a base frame member 18 having a side frame member 20 extending outwardly from each end portion thereof terminating in a wheel alignment member 22 inclined outwardly from the longitudinal center line c-c of the platform assembly 12 to engage and direct the front wheels of the personal mobility vehicle into a corresponding wheel well 24 formed on the rear portion of the platform assembly 12 adjacent the lift assembly 14. The front wheels of the personal mobility vehicle are guided into the wheel wells 24 by the corresponding side from member 20 and a corresponding intermediate frame member 26. Each wheel well 24 is cooperatively formed by the corresponding side frame member 20, the corresponding intermediate frame member 26 extending outwardly from the base frame member 18 in substantially parallel relationship to the corresponding side frame member 20 and an intermediate substantially flat cross-frame member 28 extending between the side frame members 20 and the intermediate frame members 26 in substantially perpendicular relationship therewith. An outer cross-frame member 30 extends between the wheel alignment members 22 to cooperatively support the outer end portions 32 of each intermediate frame members 26. The outer cross-frame member 30 may be inclined upwardly from the leading edge thereof to the trailing edge to service as a loading/unloading ramp for the personal mobility vehicle. The upper surface 34 of the outer end portion 32 of each intermediate frame member 26 comprises a support to engage the undercarriage of the personal mobility vehicle on the platform assembly 12.

The intermediate substantially flat cross-frame member 28 facilitates to loading and unloading of the personal mobility vehicle on to and off of the platform assembly 12.

Figure 4:
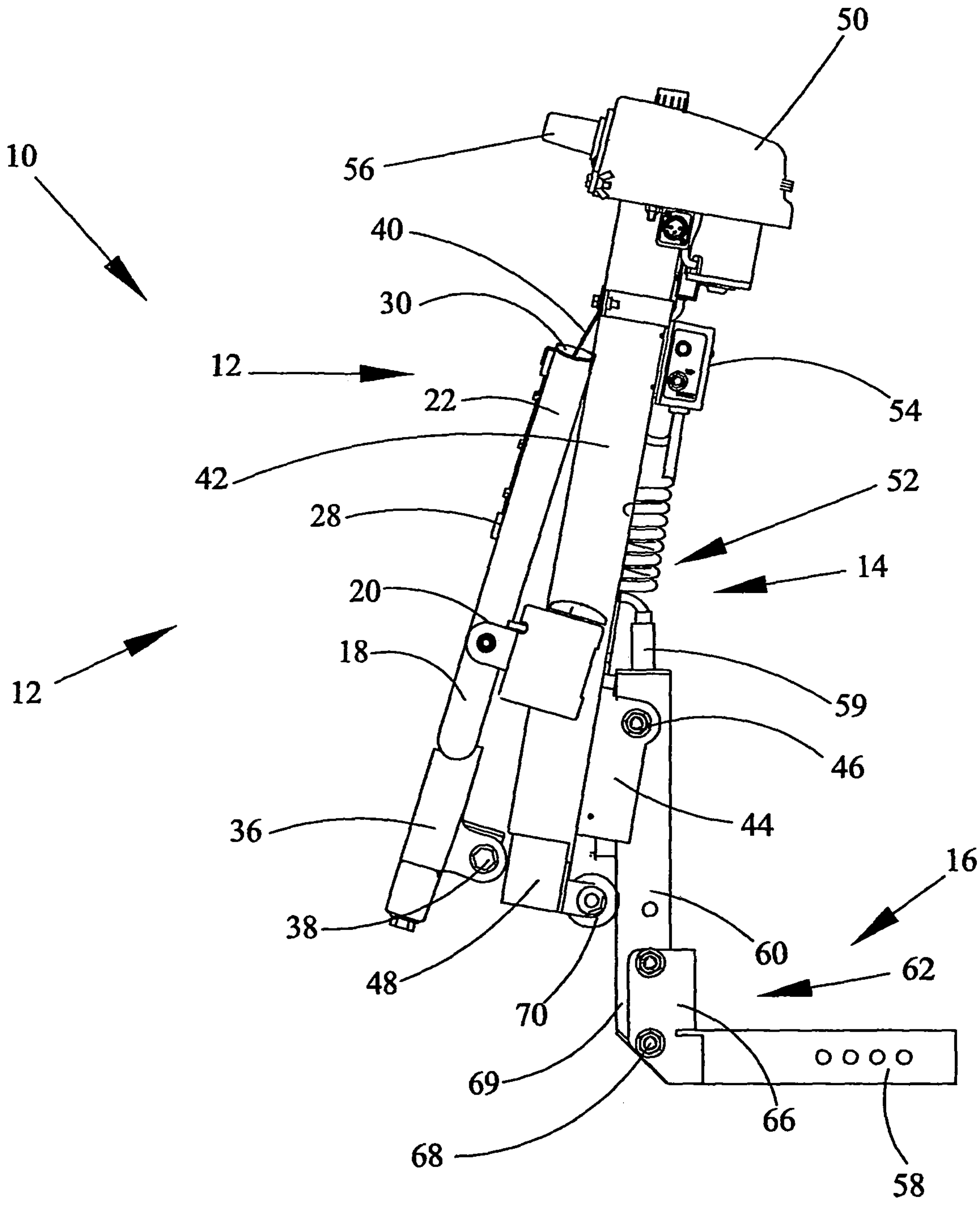
FIG. 4 is a side view of the personal mobility vehicle lift of the present invention in the upper, stored position.

The platform assembly 12 is pivotally coupled to the lift assembly 14 by a pair of attachment member or yokes each indicated as 36 affixed to the base frame member 18 and corresponding pivot pin or members 38 to allow the platform assembly 12 to be pivoted between a deployed position where the platform assembly 12 is substantially horizontal to support the personal mobility vehicle thereon as shown in FIG. 2 and a stored position as shown in FIG. 4 such that the outer cross-frame member 30 engages the inner surface of a retainer plate or member 40 to retain the platform assembly 12 in the stored position when the personal mobility vehicle lift 10 is not in use.

The lift assembly 14 comprises a substantially vertical column including a hollow upper column member 42 pivotally coupled to the mount assembly 16 by an attachment member or yoke 44 affixed to the upper column 42 and a pivot pin or member 46 to allow the lift assembly 14 and the platform assembly 12 to be tilted toward the rear of the vehicle (not shown) about 5 degrees as the platform assembly 12 is raised from the lower position to the upper position whether the platform assembly 12 is in the deployed position or stored position and a lower column member 48 telescopingly disposed within the hollow upper column member 42. A reversible motor or power drive mechanism 50 such as Warner Linear Model K2PLG20-24V-BR-18/24V mounted to the upper portion of the hollow upper column member 42 of the lift assembly 12 is operatively coupled to the lower column member 48 of the lift assembly 12 to extend or retract the lower column member 48 within the hollow upper column 42 to lower or raise the platform assembly 12 connected to the lower column member 48 by the attachment members or yokes 36 and corresponding pivot pins or members 38. The reversible motor or power drive mechanism 50 coupled to the personal mobility vehicle power source (D.C. battery) by a cable and connecting combination generally indicated as 52 includes a control switch 54. A license tag light 56 is coupled to the vehicle (not shown) by a conductor or cable 57. When the reversible motor or power drive mechanism 50 is not coupled to the personal mobility vehicle power source, the cable and connector combination 52 is detachably coupled by a retainer 59 mounted or attached to the mount assembly 16.

The mount assembly 16 comprises a substantially horizontal tongue 58 to connect or mount the personal mobility vehicle lift 10 to the vehicle (not shown) and a substantially vertical mount member 60 coupled to the hollow upper column member 42 of the lift assembly 14 by the attachment member or yoke 44 and a pivot pin or member 46.

The personal mobility vehicle lift 10 further includes a tilt mechanism to tilt the platform assembly 12 and the lift assembly 14 as previously mentioned. Specifically, the tilt mechanism comprises a cam and a cam follower generally indicated as 62 and 64 respectively. The cam 62 comprises a cam plate or member 66 attached to the mounting assembly 16 including an inclined first cam surface 68 formed thereon and a second cam surface 69; while, the cam follower 64 comprises a circular cam or disk or wheel 70 rotatably mounted to the lower portion of the lower column member 48 of the substantially vertical lift column. As best shown in FIGS. 2 and 4, the cam follower 64 is disposed to engage the inclined cam surface 68 as the lower column member 48 and the platform assembly 12 are raised to tilt the platform assembly 12 and the lift assembly 14 toward the rear of the vehicle (not shown) to engage the second cam surface 69 to increase the stability of the personal mobility vehicle lift 10 when the platform assembly 12 is in the upper position whether deployed when supporting a personal mobility vehicle or stored with the outer cross-frame member 30 retained between the hollow upper column member 42 of the lift assembly 14 and the retainer member or plate 40.

The front wheels of a personal mobility vehicle may be secured to the platform assembly 12 by a pair of tie-down devices each generally indicated as 72 similar to the locking tie-down mechanisms disclosed in U.S. Pat. No. 6,729,827. Each tie-down 72 includes a hook or clasp 74 that passes through an aperture 76 formed in a bracket 78 affixed to the lower portion or bottom of the seat of the personal mobility vehicle.

As shown in FIG. 2, the tie-down device 72 are substantially aligned vertically with the wheel axles of the front wheels along lateral line BB. When the personal mobility vehicle is secured to the platform assembly 12, the weight of the personal mobility vehicle is distributed equally on both sides of the longitudinal center line AA thereof.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A personal mobility vehicle lift mounted to the rear portion of a vehicle to transport the personal mobility vehicle from location to location comprising a platform assembly configured to support a personal mobility vehicle thereon pivotally coupled to a lift assembly including a substantially vertical column having an upper portion to selectively raise and lower said platform assembly between an upper and lower position with or without a personal mobility vehicle thereon and a mount assembly coupled to said lift assembly to mount said personal mobility vehicle lift to the rear portion of a vehicle such that said platform assembly is deployed in a substantially horizontal position by positioning said platform assembly relative to said lift assembly whereby a personal mobility vehicle is moved on to or off of said platform assembly when in said lower position and transported from location to location when in said upper position in spaced relationship relative to the ground or support surface and stored in a substantially vertical position by positioning said platform assembly in said upper position relative to said lift assembly whereby said personal mobility vehicle lift is moved from location to location without a personal mobility vehicle thereon, said platform assembly comprises a frame including a base frame member having an end portion at each end thereof disposed substantially perpendicular to the center line of the vehicle and having a side frame member including an inner end affixed to each said end portion of said base frame member and having a proximal portion disposed substantially parallel to the center line of the vehicle and an outer free end angled outwardly from said proximal portion, and a pair of substantially parallel spaced apart intermediate frame members disposed between said side frame members each including an inner end affixed to said base frame member and having an upper surface portion wherein the distance between said inner end of each said side frame member is less than the distance between said outer free ends of said side frame members such that each said outer inclined free end comprises a vehicle alignment member extending outwardly in the horizontal plane relative to the center line of the vehicle to engage the outer side of each front wheel of the personal mobility vehicle to guide the vehicle laterally onto said platform assembly.

2. The personal mobility vehicle lift of claim 1 wherein said intermediate frame members are spaced relative to each other to cooperatively form a wheel guide to engage the inner side of each front wheel of the personal mobility vehicle to position the personal mobility vehicle laterally on said platform assembly to distribute the weight of the personal mobility vehicle substantially equally on opposite side of the longitudinal center line of said platform assembly.

3. The personal mobility vehicle lift of claim 1 further including an outer cross-frame member extending between said side frame members to cooperatively support said outer end portions of each said intermediate frame members.

4. The personal mobility vehicle lift of claim 3 wherein said outer cross-frame member is inclined upwardly from the leading edge to the trailing edge thereof as a loading/unloading ramp for the personal mobility vehicle.

5. The personal mobility vehicle lift of claim 3 further including a retainer member attached to said lift assembly to retain said platform assembly in said substantially vertical position when said platform assembly is in said upper position and said platform assembly is in said stored position, said retainer member comprises a retainer plate affixed to said upper portion of said substantially vertical column such that said outer cross-frame member is retained between said retainer plate and said substantially vertical column when said platform assembly is in the upper or stored position.

6. The personal mobility vehicle lift of claim 1 wherein said upper surface of each said intermediate frame member comprises a support to engage the undercarriage of the personal mobility vehicle of said platform assembly.

7. A personal mobility vehicle lift mounted to the rear portion of a vehicle to transport the personal mobility vehicle from location to location comprising a platform assembly configured to support a personal mobility vehicle thereon pivotally coupled to a lift assembly including a substantially vertical column having an upper portion to selectively raise and lower said platform assembly between an upper and lower position with or without a personal mobility vehicle thereon and a mount assembly coupled to said lift assembly to mount said personal mobility vehicle lift to the rear portion of a vehicle such that said platform assembly is deployed in a substantially horizontal position by positioning said platform assembly relative to said lift assembly whereby a personal mobility vehicle is moved on to or off of said platform assembly when in said lower position and transported from location to location when in said upper position in spaced relationship relative to the ground or support surface and stored in a substantially vertical position by positioning said platform assembly in said upper position relative to said lift assembly whereby said personal mobility vehicle lift is moved from location to location without a personal mobility vehicle thereon, said platform assembly comprises a frame including a base frame member having an end portion at each end thereof disposed substantially perpendicular to the center line of the vehicle and having a side frame member including an inner end affixed to each said end portion of said base frame member and having a proximal portion disposed substantially parallel to the center line of the vehicle and an outer free end angled outwardly from said proximal portion, and a pair of substantially parallel spaced apart intermediate frame members disposed between said side frame members including an inner end affixed to said base frame member and having an upper surface portion wherein the distance between said inner end of each said side frame member is less than the distance between said outer free ends of said side frame members such that each said outer free end comprises a vehicle alignment member extends outwardly in the horizontal plane relative to the center line of the vehicle to engage the outer side of each front wheel of the personal mobility vehicle to guide the vehicle laterally onto said platform assembly wherein said intermediate frame members are spaced relative to each other to cooperatively form a wheel guide to engage the inner side of each front wheel of the personal mobility vehicle to position the personal mobility vehicle laterally on said platform assembly to distribute the weight of the personal mobility vehicle substantially equally on opposite side of the longitudinal center line of said platform assembly further including an outer cross-frame member extending between said side frame members to cooperatively support said outer end portions of each said intermediate frame members and a retainer member attached to said lift assembly to retain said platform assembly in said substantially vertical position when said platform assembly is in said upper position and said platform assembly is in said stored position, said retainer member comprises a retainer plate affixed to said upper portion of said substantially vertical column such that said outer cross-frame member is retained between said retainer plate and said substantially vertical column when said platform assembly is in the upper or stored position and wherein said upper surface of each said intermediate frame member comprises a support to engage the undercarriage of the personal mobility vehicle of said platform assembly.

* * * * *